COLOR SWITCHING CIRCUIT FOR A SINGLE GUN COLOR TELEVISION RECEIVER

Filed Oct. 12, 1967 2 Sheets-Sheet 1

INVENTORS.
PHILLIP ANDRADE
KURT HILLMAN
BY Joseph H. Roedger
ATTORNEY.

COLOR SWITCHING CIRCUIT FOR A SINGLE GUN COLOR TELEVISION RECEIVER

Filed Oct. 12, 1967 2 Sheets-Sheet 2

INVENTORS.
PHILLIP ANDRADE
KURT HILLSMAN

BY Joseph H. Roediger
ATTORNEY.

United States Patent Office 3,539,713

Patented Nov. 10, 1970

3,539,713

COLOR SWITCHING CIRCUIT FOR A SINGLE GUN COLOR TELEVISION RECEIVER

Phillip Andrade, Long Island City, and Kurt Hillman, New York, N.Y., assignors to General Telephone & Electronics Laboratories Incorporated, a corporation of Delaware Filed Oct. 12, 1967, Ser. No. 674,842
Int. Cl. H04n 9/26
U.S. Cl. 178—5.4 10 Claims

ABSTRACT OF THE DISCLOSURE

A switching circuit for generating a staircase switching voltage at line sequential rates for the color switching grid of a single gun color television receiver is described. The staircase voltage, which is supplied to a wire grid, is generated by charging the grid capacitance in a resonant manner, reversing the polarity of the voltage in a resonant manner without substantial power loss, and then discharging the capacitance before repeating the cycle. The charging, polarity reversal and discharge take place during successive horizontal retrace periods of the cathode rav tube.

BACKGROUND OF THE INVENTION

This invention relates to a switching circuit for use in color television receivers containing single gun cathode ray tubes and more particularly to a switching circuit for varying, at a line sequential rate, the voltage applied to the color switching grid of the tube.

Color television receivers employing a single electron beam to scan an image screen containing successive groups or series of light emissive elements, the elements of each series being emissive of light made of different primary colors in response to electron impingement, have been described in the literature. The image to be displayed on the screen is generated by presenting the red, green and blue information sequentially at a predetermined rate. The rate at which the color information is presented determines whether the system is referred to as dot, line or field sequential in its display.

In contradistinction, a conventiontl three-electron beam shadow mask display tube presents all three colors simultaneously rather than sequentially. Each beam is modulated in accordance with the color information of a single color. The single beam color tube which utilizes a color switching grid to insure that the beam impinges on the desired phosphor has several advantages that are not found in three beam tubes. One major advantage of the single beam tube is due to the fact that three electron beams do not have to exhibit convergence over the entire display area. An additional advantage is that any variation in the electron gun characteristics during the operating life of the tube affects the display of the different colors equally. Further, the single beam tube exhibits a stability with respect to monochrome balance and grey scale tracking not found in three beam display tubes. Generally, the single gun tube utilizing a switching grid requires less power than the three gun shadow mask tube. As a result, the receiver employing a one gun switching grid tube can be made more compact and the ratings of the components therein can be reduced. In addition, the relatively low power consumption of this type of receiver has generated interest in the developmnt of more efficient circuits for use therein. By reducing the power consumption of the receiver, the size of the power supply needed for a portable receiver is also reduced.

During the operation of the one gun tube, the electron gun horizontally scans very narrow vertical stripes of red, blue and green phosphors. The voltage between two coplanar interlaced fine-wire meshes which form a color switching grid adjacent the phosphor stripes is varied to deflect the electron beam to the appropriate phosphor. The red, green and blue color difference signals separated from the received composite signal are sampled sequentially by a decoding circuit to modualte the electron beam. In the same sequence, the voltage between the wire meshes is switched so that each color signal modulates the beam when it illuminates only the respective colored phosphor.

Generally, the screen containing the phosphor stripes is fabricated and positioned with respect to the switching grid so that grid wires are in registration with the stripes of two of the three colors. The stripes of the third color lie midway between adjacent grid wires. In practice, the color of the stripe lying between the adjacent grid wires is used to describe the color stripe pattern of the tube. For example, with a blue centered pattern, the color switching grid wires are in registration with the red and green stripes. In this case, there is one terminal for the wires over the red stripes and another for those over the green stripes. Thus, the grid can be considered to be divided into first and second sets of interlaced spaced interconnected elements with the voltage applied between the two terminals determining which color stripe the electrons will strike.

The waveform of the voltage applied between the two terminals of the color switching grid, i.e. between alternate wires of the interlaced wire grid structure, is a staircase waveform. The levels of this staircase waveform are plus, corresponding to the deflection of the beam in one direction, zero, corresponding to the impingement of the beam on the phosphor stripe between the grid wires, and negative, corresponding to the deflection of the beam in the opposite direction.

The load impedance of the switching grid is essentially capacitive with a magnitude of tne order of 1000 picofarads. In addition, the shunting resistance is very high for a typical tube, of the order of several megohms. As a result, the required waveform may be reproduced by charging the grid during the horizontal retrace period to the desired voltage level and then disconnecting the wire grid during the active horizontal scanning period. At the completion of the horizontal trace period, the polarity of the applied voltage is reversed and the capacitance of the grid is discharged and then charged to the same magnitude but in the reverse direction. At the completion of the next succeeding scan, the grid capacitance is discharged so that essentially no voltage exists between the first and second sets of elements.

SUMMARY OF THE INVENTION

The present invention relates to a switching circuit for varying the voltage applied to the color switching grid of a single gun cathode ray tube wherein the power consumption is minimized.

The color switching grid of a single gun cathode ray tube generally comprises first and second sets of spaced wire-like elements interposed between the electron gun and the display screen. The application of a voltage between the sets produces an electric field therebetween which deflects the beam and, thereby, controls the display of color information.

The elements of each set are interconnected and coupled to a corresponding terminal. Since the elements of the grid are interlaced, the impedance of the deflection grid is capacitive in nature. The magnitude and polarity of the voltage applied between the first and second terminals determines the direction of deflection, if any, of the beam. The waveform of the color switching voltage between the grid terminals is a staircase pattern containing three levels. The middle level, corresponding to zero deflection and referred to herein as the quiescent level, is normally 5,000 volts since this is the color focusing voltage for the switching grid of the tube. The switching of the voltage to the different levels takes place during the horizontal retrace period at the completion of each line scan.

The present switching circuit includes inductive means having first and second terminals with the second terminal being coupled to the first set of elements of the grid. The grid capacitance is charged to one level of the staircase waveform by charging means which applies a reference voltage between the first terminal of the inductance and the second set of elements. The charging means is actuated to apply the voltage during the horizontal retrace period. At the completion of this period, the means is no longer actuated and the voltage is removed from across the combination of the inductance L and the grid capacitance $C_G$. As a result, the grid capacitance is charged to a voltage level determined by the magnitude of the applied voltage, the length of time that the switch is actuated $\tau$ and the product $LC_G$. Since the voltage on the capacitance $C_G$ must be fixed by the start of the next horizontal line scan, the time interval $\tau$ is at least as short as the horizontal retrace period, i.e. 12 $\mu$sec. In order to insure that the grid capacitance is charged to the maximum voltage, the magnitude of the inductance L is chosen so that the quantity $\pi\sqrt{LC_G}$ is substantially equal to the interval $\tau$.

When the charging means is deactuated, i.e. at the start of the horizontal scan period, the grid capacitance is charged to a voltage essentially twice that of the applied reference voltage. In addition, polarity reversal means is coupled between the first terminal of the inductance and the second set of grid elements. The polarity reversal means is actuated during the following horizontal retrace period and results in a reversal of the polarity of the charge stored in the color switching grid. This means acts as an electrical short-circuit and comprises a low impedance switch coupled between the first terminal of the inductance and the second set of grid elements. The means is deactuated by the time that the next succeeding horizontal line scan is initiated. The means provides an essentially lossless reversal of the polarity of the charge on the grid capacitance. The time required for this charge reversal is determined by the quantity $\pi\sqrt{LC_G}$. During this line scan, the voltage on the grid has a magnitude that is twice that of the reference voltage but is opposite in polarity. As a result, the electron beam is deflected to a different phosphor during this scan.

At the completion of this line scan, the voltage between the first and second sets of grid elements is to be reduced to essentially zero. In other words, the color switching grid is to be at its quiescent voltage level of about 5 kv. This is provided in the present switching circuit by means for discharging the grid capacitance during the horizontal retrace period. The discharging means is coupled between the first and second sets of elements of the grid and, when actuated, provides a resistive discharge path therebetween. The discharge is required to be essentially completed during the horizontal retrace period so that the resistance of this means is determined by the magnitude of the grid capacitance. To insure that the grid capacitance is discharged to within 10 percent of its quiescent voltage, the magnitude of the resistance of the discharging means is made at least as the quantity $\tau/2.2C_G$, where $\tau$ is equal to $\pi\sqrt{LC_G}$.

The charging, polarity reversal and discharging means of the switching circuit are coupled to an actuating means, typically a ring counter coupled to the horizontal scan generator, which sequentially actuates them during consecutive horizontal retrace periods for a time interval $\tau$. The present circuit provides a substantial reduction in the power consumed thereby when compared with switching circuits heretofore proposed. It shall be noted that essentially all of the power dissipation occurs during the discharge of the grid capacitance. This is, therefore, the power to be supplied by the battery of a portable receiver utilizing this circuit. In practice, the present circuit has been found to reduce the power consumption required to develop the color switching voltage to 10–20 percent of that required by other types of grid switching circuits.

Further features and advantages of the invention will become more readily apparent from the following detailed description taken in conjunction with the accompanying drawings.

DESCRIPTION OF THE PREFEIRED EMBODIMENT

Figure 1:
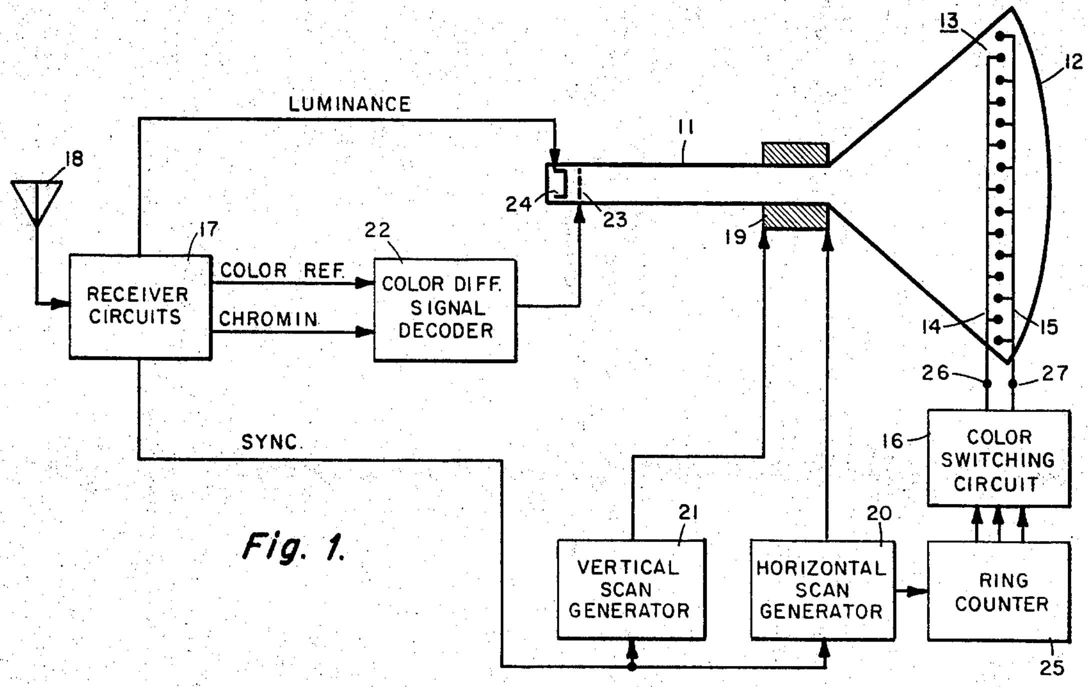
FIG. 1 is a block schematic diagram of a single gun color television receiver.

Referring now to FIG. 1, there is shown a color television receiver employing a single gun cathode ray tube 11. The face plate 12 of the tube is provided with light emissive materials (not shown), normally red, green, and blue phosphors disposed in a vertical stripe configuration. Color switching grid 13, spaced adjacent to faceplate 12, is shown comprising first and second sets of electron deflecting elements 14 and 15 respectively. The first and second sets of elements 14 and 15 are coupled to color switching circuit 16 via the corresponding terminals 26 and 27.

The receiver circuits 17 of FIG. 1 are conventional circuits which receive the composite color signal from antenna 18 and derive the chrominance, luminance, synchronizing, and color reference signals therefrom. The synchronizing signals are supplied to horizontal and vertical scan signal generators 20 and 21 which provide the deflection currents for the yoke 19 of tube 11.

The color reference and chrominance signals provided by receiver circuits 17 are supplied to signal decoder 22. The decoder normally contains a band pass amplifier that passes only the 3.58 mc. chrominance signal and the 0.5 mc. sidebands on either side of the suppressed subcarrier. The luminance component is filtered out. In the decoder, the chrominance signal is demodulated by a synchronous detector to which a local subcarrier is applied. The phase of the local subcarrier is shifted at the start of each horizontal line scan so that the particular color difference signal to be displayed is provided at the decoder output. One type of color difference signal decoder is described in an article in "Electronics," May 31, 1965 on pages 81–85.

As shown, color difference signals from the signal decoder 22 are coupled to control grid 23 of tube 11. The luminance signal is coupled from the receiver circuits 17 to the cathode 24 of tube 11. As a result, the color difference signals, G–Y, R–Y and B–Y are added to the luminance signal Y in tube 11 to provide the video drive signal between the control grid and the cathode. Each color difference signal is supplied to the grid for the horizontal scan period H with the period between the leading edges of successive signals of the same color difference signal being 3H. To insure that the beam impinges on the corresponding phosphor stripe during the interval of a particular color difference signal, the voltage applied to the color switching grid must be varied in synchronism with the horizontal scan signal. As shown in FIG. 1, the horizontal scan generator 20 is coupled to ring counter 25 which provides three output signals. The horizontal scan signal is comprised of narrow pulses at the horizontal line rate of approximately 15,735 kc. with the period between the leading edges of successive pulses being referred to as H. These narrow pulses are counted in ring counter 25 which generates three pulse output signals at different terminals thereof. The three output signals from the ring counter are displaced in time relative to each other by the interval H and provide the timing for the variation in the grid voltage. In other words, each of the ring counter output signals corresponds to the line scan of a single color on faceplate 12.

The faceplate 12 is provided with red, green and blue phosphor stripes disposed in a parallel configuration. The switching grid 13 is disposed within the tube adjacent to the phosphor stripes. In FIG. 1, both the stripes and the elements of the grid 13 are taken to be perpendicular to the plane of FIG. 1. As will later be apparent, the electron beam scanning the phosphor stripes may scan in a pattern which is perpendicular to or parallel to the individual stripes. In practice, the scan pattern of the electron beam is perpendicular to the individual stripes. The electric field between the first and second elements of the grid 13 due to the application of a voltage between terminals 26 and 27 is such as to cause the beam to impinge only upon a single color phosphor during a particular line scan. The voltage between the first and second elements 14 and 15 of the grid is varied during the horizontal retrace period preceding each line scan so that the individual colors are sequentially displayed.

Figure 2:
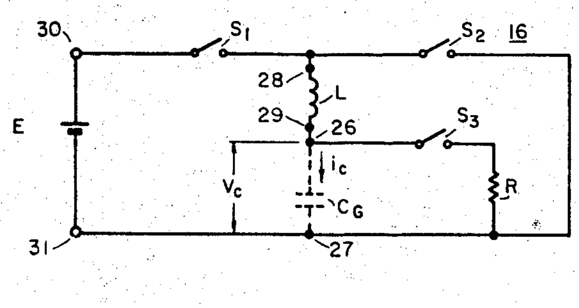
FIG. 2 is a schematic diagram of one embodiment of the invention.

The sequential switching of the voltages applied between the first and second elements of the grid is controlled by color switching circuit 16. The switching of the grid voltages is maintained in synchronism with the horizontal scan signal by the actuating means 25, typically a ring counter, which is coupled to horizontal scan generator 20. A schematic diagram of the color switching circuit 16 is shown in FIG. 2, wherein the capacitance $C_G$ represents the capacitance between the first and second elements of grid 13. Terminals 26 and 27 represent the common terminals for the first and second sets of elements of the color switching grid respectively. Second terminal 29 of inductance L is coupled to terminal 26. The first terminal 28 of the inductance is coupled through switch $S_1$ to the first switching circuit input terminal 30. In addition, switch $S_2$ is shown coupled between the terminal 28 of inductance L and terminal 27 of the second set of elements. As shown, terminal 27 of the grid is coupled to second switching circuit input terminal 31. A discharge path for the capacitance of the switching grid is provided between terminals 26 and 27 and comprises switch $S_3$ connected in series with discharge resistor R.

The reference voltage source E is shown coupled between switching circuit input terminals 30 and 31. The magnitude of the reference voltage of the source is chosen to be one-half that required between the first and second sets of elements to deflect the beam so that it impinges on a phosphor stripe which is in registration with the elements of the grid.

Figure 3A:
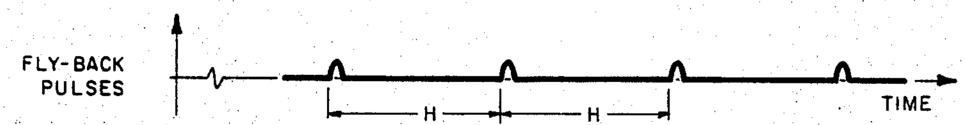
FIGS. 3*a*–3*c* are timing diagrams showing the waveforms of the current and voltage in the embodiment of FIG. 2.
Figure 3B:
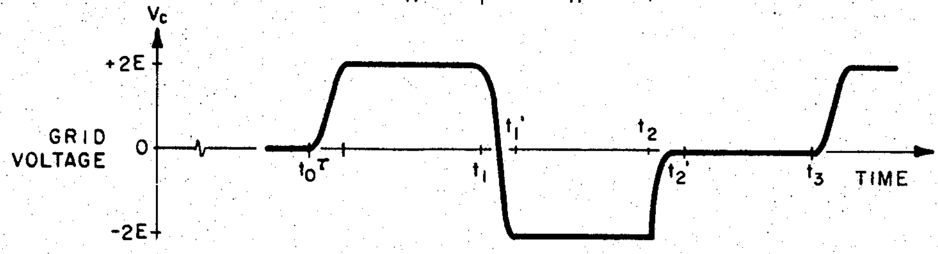
Figure 3C:
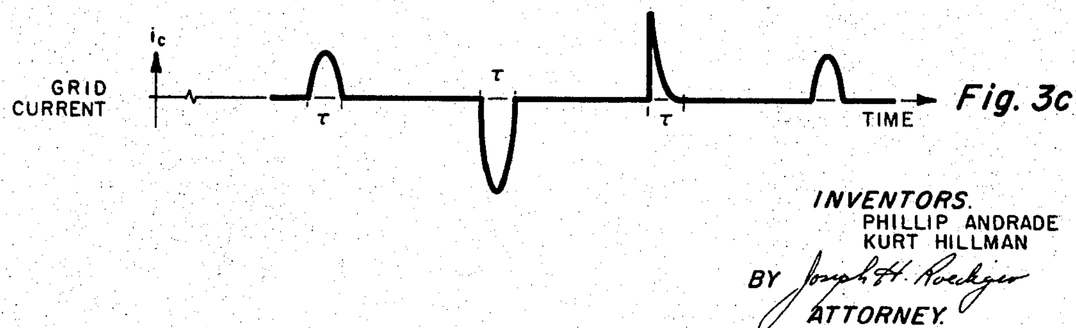

Referring now to the waveforms of FIGS. 3*a*–3*c*, the horizontal fly-back pulses are shown in FIG. 3*a* occurring at the horizontal scan frequency with the interval H between the leading edges of successive pulses. Each pulse corresponds to the occurrence of a horizontal line scan of the faceplate. The waveform of FIG. 3*b* shows the color switching voltage appearing between the first and second sets of elements of grid 13, i.e. the voltage across capacitor $C_G$ of FIG. 2. This voltage is required to assume a different level for each line scan interval. For example, during the interval $t_1$–$t_0$ a positive voltage is applied between the elements of the grid and the scanning beam is deflected to impinge upon a single color phosphor during the scanning interval. At the completion of the horizontal scanning, the electron beam retraces during a horizontal retrace period and it is during this interval shown as $t_1'$–$t_1$, that the voltage across the capacitance $C_G$ is reversed in polarity. Therefore, at the beginning of the next horizontal scan which occurs during the interval $t_2$–$t_1'$ the electron beam would impinge on a different color phosphor. At the completion of this scan, time $t_2$, the capacitance $C_G$ is discharged so that the voltage between the first and second elements of the grid is essentially 0. This discharge takes place during the horizontal retrace period $t_2'$–$t_2$ so that during the next succeeding horizontal line scan $t_3$–$t_2'$ the beam impinges upon the third color phosphor. When this scan is completed at time $t_3$, the entire procedure is repeated. During the active horizontal scanning intervals, the wire grid is not connected to the voltage source. This type of operation is suitable for producing the required waveform due to the high shunting resistance between the deflection grid and the elements of the display tube. Typically, this resistance is of the order of several megohms. While heretofore the capacitor has been charged and discharged between successive horizontal scan intervals, the dissipation during each change in the voltage between the first and second sets of elements has required substantial power consumption. Due to the increasing interest in battery operated color television receivers, it is desirable to minimize the power consumption of the color switching circuit.

The circuit shown in FIG. 2 has been found to provide a substantial reduction in the power consumption of the color switching circuit by utilizing resonant circuit type charging and discharging cycles. In operation, the capacitance $C_G$ is initially uncharged, and switches $S_1$, $S_2$ and $S_3$ are open. This is the interval prior to $t_0$. At $t_0$, $S_1$ closes and in a half cycle, the time interval of $\tau=\pi\sqrt{LC_G}$, the capacitance $C_G$ is charged to a voltage level of twice that of the reference voltage. Since the capacitance $C_G$ is fixed by the particular display tube utilized, the magnitude of the inductance L is selected so that the time interval $\tau$ is of the order of 12 microseconds or less. This period of time corresponds to the conventional horizontal retrace interval. The voltage and current waveforms for the color switching grid capacitance $C_G$ are shown in FIGS. 3*b* and 3*c* respectively. As shown, the voltage is a cosine wave and the current a sine wave. The surge impedance of the tank circuit comprising inductance L and capacitance $C_G$ equals $\sqrt{L/C_G}$ so that the current has a peak magnitude of $E/\sqrt{LC_G}$. At the completion of this horizontal retrace period, switch $S_1$ is opened and the capacitor remains at the voltage level +2E until $t_1$. At time $t_1$, switch $S_2$ is closed for the interval $t_1'$–$t_1$ and the capacitor charge is reversed in a resonant manner essentially without dissipation to a voltage level minus 2E. Then at time $t_1'$, switch $S_2$ is opened.

The capacitance $C_G$ remains at voltage level −2E until time $t_2$. At time $t_2$, switch $S_3$ is closed whereupon capacitance $C_G$ is discharged exponentially through discharge resistor R. As a result, the voltage across capacitor $C_G$ is essentially zero at the start of the following horizontal scan interval. The peak discharge current is approximately $2E/R$ with the magnitude of resistor R being selected so that the capacitance $C_G$ is essentially discharged during the horizontal retrace interval. In practice, the resistor R is required to have a magnitude which is at least as small as $\tau/2.2C_G$ with the effective discharge interval being approximately $2.2RC_G$. This limitation on the magnitude of resistor R insures that the grid capacitance is discharged to 10 percent of its peak voltage during the horizontal retrace period. The peak discharge current is $2E/R$.

The circuit dissipation occurring during the above described sequence of operations is essentially only that occurring by the action of switch $S_3$ in discharging capacitance $C_G$ through discharge resistor R. Since this power must be supplied by the reference voltage source E, the power input to the color switching circuit 16, neglecting all losses except that corresponding to the discharge of the grid capacitor, is determined by the following formula $$\text{Power}=\frac{1/2C_G(2E)^2}{3H}=\frac{2C_GE^2}{3H}$$

In one embodiment wherein the capacitance $C_G$ of the grid was $10^{-9}$ f., the horizontal scan period H was $63.5\times10^{-6}$ sec. and he reference voltage E was equal to 100 v., the power input was computed in accordance with the above formula to be 105 milliwatts. The power input to this embodiment during operation was found to be less than 150 milliwatts and included the losses due to the switches $S_1$, $S_2$, and $S_3$.

The power consumption of the present switching circuit is substantially lower than that characteristic of switching circuits heretofore employed in single gun cathode ray tubes. Previously, the required battery voltage was 2E, that voltage required to deflect the beam and produce the corresponding color. Therefore, the energy input to the capacitor at time $t_0$ is $\frac{1}{2}C_G(2E)^2$ or $2E^2C_G$ with an equal amount of energy being dissipated due to the resistance of the battery and the circuit connections. Thus, the battery is required to supply $4E^2C_G$ during this interval. At time $t_1$, the energy required to be provided from a battery having a voltage of 2E in order to discharge the capacitor and raise it to —2E from +2E is $8E^2C_G$. Therefore, the total energy required for the three line scan interval of 3H by the switching circuits heretofore employed is equal to $12E^2C_G$ and the power input to the switching grid circuit is $$\frac{12E^2C_G}{3H}\text{ or }\frac{4E2C_G}{H}$$

It shall be noted that the present switching circuit results in a power input requirement of essentially ⅙ of that set forth above.

The switching circuit of FIG. 2, in normal use, is maintained at the mean potential equal to the quiescent voltage level, typically 5 kv., of the wire grid. As recognized, this mean potential is the color focusing potential for the cathode ray tube and is applied directly to the color switching grid. The circuit of FIG. 2 was operated directly by the "fly back" pulses from the horizontal scan generator 20 without rectification. Although this results in the extraction of energy from the scan generator, this energy is relatively small when compared with the energy circulating in the horizontal deflection system. However, if desired, the flyback pulses may be converted to DC by rectification in order to minimize the energy loss.

Figure 4:
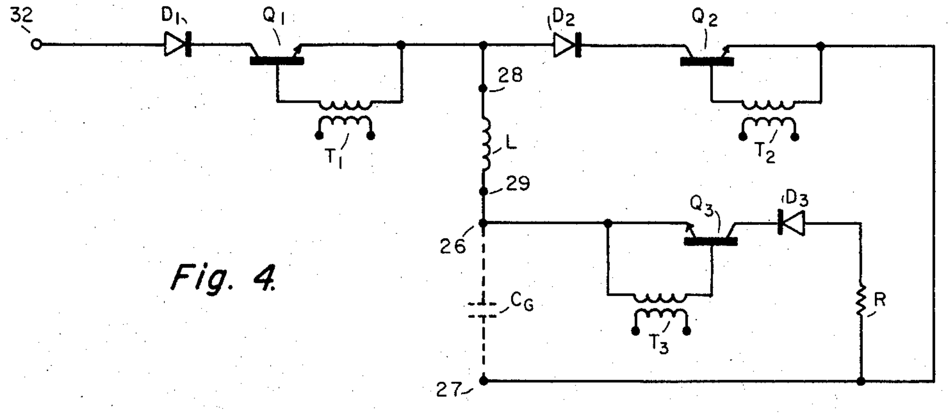
FIG. 4 is a detailed schematic diagram of one embodiment of the invention.
Figure 5:
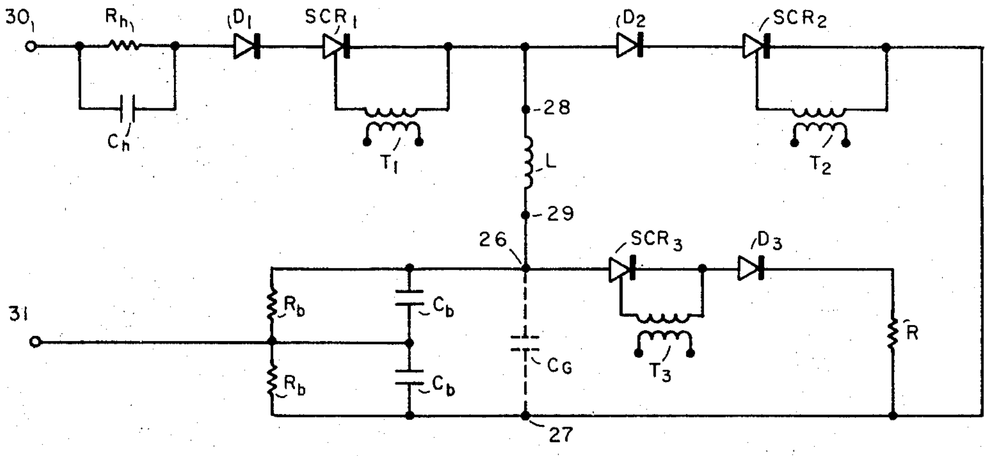
FIG. 5 is a schematic diagram of another embodiment of the invention.

Two specific embodiments of the invention are shown in detail in FIGS. 4 and 5. The circuit of FIG. 4 employs transistors $Q_1$, $Q_2$ and $Q_3$ as the switches $S_1$, $S_2$ and $S_3$ respectively of FIG. 2. The transistors contain first, second and control electrodes which correspond to the collector, emitter and base electrodes. The base electrodes of the transistors are coupled to a secondary winding of a corresponding pulse transformer $T_1$, $T_2$, and $T_3$. The primary windings are insulated from the secondary windings so as to withstand the mean quiescent voltage level of 5 kv. The primary windings of these transformers are coupled to the rig counter 25 of FIG. 2. When the transformers are energized sequentially in accordane with the flyback pulses of FIG. 3*a*, the transistors are rendered conductive in sequence and the circuit operates as described in connection with FIG. 2.

The circuit of FIG. 4 contains first, second and third diodes $D_1$, $D_2$ and $D_3$ respectively, coupled to the collector electrodes of the corresponding transistors. The diodes are poled to provide reverse blocking of the junction between the collector and base electrodes of the transistors. The incorporation of the diodes in the circuit prevents current flow through this junction when the transistors are nonconductive. In addition, it shall be noted that the circuit is shown in single-ended form with the reference voltage E being applied between terminals 32 and 27. However, the voltage developed on the color switching grid is not balanced since terminal 27 is coupled to ground and for certain applications it may be desirable to operate the circuit in a double-ended manner to develop a balanced voltage. This alternative is shown in connection with the embodiment of FIG. 5.

In the circuit of FIG. 4, the transistors $Q_1$, $Q_2$ and $Q_3$ employed were Type 2N3439, the capacitance $C_G$ was 1000 pf., the inductance L was 10 mh., and the resistor R was 2 megohms. The time interval $\tau$ was equal to approximately 10 $\mu$sec. The power consumption of this circuit with a reference voltage of E equal to 100 v. was approximately 130 milliwatts.

The circuit in FIG. 5 employs silicon-controlled rectifiers (SCR) rather than transistors as the switching means. As shown, the SCR contains first, second and control electrodes with conduction between the first and second electrodes being initiated by the application of a relatively low voltage of appropriate polarity to the control electrode. The low voltage required to initiate conduction in an SCR enables relatively small and inexpensive trigger transformers to be employed therewith. Generally, conduction in an SCR ceases when the voltage at the second electrode exceeds that at the first electrode. Thus, diodes $D_1$, $D_2$ and $D_3$ are not required for a color switching circuit using SCR's as the switching elements. In practice however, the recovery of commercially available SCR's from the conducting to the high resistance state is not always sufficiently rapid to render them nonconductive before the start of the horizontal line scan. Therefore, it is preferable to employ diodes to insure that the flow of reverse current through the SCR's is inhibited. In the circuit shown in FIG. 5, it will be noted that diode $D_1$ is required to block a voltage of E while diodes $D_2$ and $D_3$ must block the full voltage 2E between the grid terminals 26 and 27.

In addition, it will be noted that in the circuit of FIG. 5 $SCR_1$ and $SCR_2$ are connected with the second electrode of $SCR_1$ coupled through diode $D_2$ to the first electrode of $SCR_2$. Thus, it appears that the circuit may have a stable mode of operation in which both $SCR_1$ and $SCR_2$ are conductive. Since the circuit depends on the sequential actuation of the three switch means, this mode of operation should be inhibited. To this end, a limiting resistor $R_h$ and a bypass capacitor $C_h$ are coupled between $SCR_1$ and input terminal 30 and the reference voltage is increased to +E'. Since a particular holding current $I_h$ is required to maintain $SCR_1$ and $SCR_2$ concurrently conductive, this condition can not occur if $$\frac{E'}{R_h}<I_h$$

In addition, the reference voltage E must be equal to $E'—I_{av}R_h$ wherein $I_{av}$ is the average current. The average current may be determined from the power supplied to the circuit. Therefore, the magnitude of the resistor $R_h$ must be greater than $$\frac{E}{I_h—I_{av}}$$

However, to avoid this mode it is necessary that the SCR's employed have holding currents $I_h$ in excess of the average current $I_{av}$, normally about 1 ma. In the embodiment, Type 2N2329 SCR's were employed.

As shown in FIG. 5, a balancing network comprising first and second capacitors $C_b$ and first and second resistors $R_b$ is coupled between input terminal 31 and switching grid terminals 26 and 27. The balancing capacitors $C_b$ which are coupled between terminals 26 and 27 are selected to be relatively large compared to the shunt capacitances between the grid and elements of the tube structure. In practice, capacitors $C_b$ are about 390 pf. The resistors $R_b$ which are coupled between the terminals 26 and 27 are required to be sufficiently large, for example 1 megohm, so that the charge on the grid capacitance does not decay significantly. The terminals between the balancing capacitors and the balancing resistors are connected to second input terminal 31. The effect of this balancing network is to enable the voltages on both the first and second sets of elements of the grid to vary in a balanced manner rather than varying the voltage on only one set of elements as in the embodiment shown in FIG. 4.

While the above description has referred to specific embodiments of the invention, it will be recognized that many modifications and variations may be made therein without departing from the spirit and scope of the invention.

What is claimed is:

1. In a color television system containing a single beam cathode ray tube having a color switching grid therein adjacent the screen, said grid including first and second sets of spaced elements having a grid capacitance $C_G$ therebetween, a switching circuit for applying the color switching voltage between said sets of elements comprising:

(a) inductive means having first and second terminals, said second terminal being coupled to the first set of elements;

(b) charging means for applying a reference voltage between the first terminal of said inductive means and the second set of elements, (c) polarity reversal means coupled between the first terminal of said inductive means and the second set of elements, (d) discharging means coupled between first and second sets of elements for reducing the voltage therebetween to essentially its quiescent level, (e) actuating means coupled to said charging, polarity reversal and discharging means for sequentially actuating said charging, polarity reversal and discharging means during successive horizontal retrace periods of said system thereby producing a staircase waveform switching voltage between the first and second sets of elements of said color switching grid.

2. The switching circuit in accordance with claim 1 wherein said charging means and said polarity reversal means are each actuated for an interval $\tau$ which is at least as short as the horizontal retrace period of said system, and the magnitude L of the inductive means is such that said grid capacitance is charged during said interval $\tau$ to a voltage having a magnitude which is essentially twice that of the reference voltage.

3. The switching circuit in accordance with claim 2 wherein the magnitude L of said inductive means is such that the quantity $\pi\sqrt{LC_G}$ is equal to the interval $\tau$.

4. The switching circuit in accordance with claim 3 wherein said charging means comprises:

(a) first and second switching circuit input terminals, said second input terminal being coupled to said second set of elements, said first and second terminals having a reference voltage therebetween, (b) first switching means coupled between said first input terminal and the first terminal of said inductive means, said means being actuated during the horizontal retrace period of said system.

5. The switching circuit in accordance with claim 4 wherein said polarity reversal means comprises second switch means coupled between the first terminal of said inductive means and the second set of elements, said switch means providing a low impedance path therebetween when actuated.

6. The switching circuit in accordance with claim 5 wherein said discharge means comprises:

(a) third switch means actuated for the interval $\tau$ by said actuating means, and (b) a discharge resistor connected in series with said switch means, said discharge resistor having a magnitude at least as low as the quantity $\tau/2.2C_G$.

7. The switching circuit in accordance with claim 6 further comprising (a) a first diode having first and second electrodes, said diode being poled to pass current flowing from said first to second electrodes, said first electrode being coupled to the first switching circuit input terminal, said second electrode being coupled to said first switch means, (b) a second diode having first and second electrodes, said diode being poled to pass current flowing from said first to second electrodes, said first electrode being coupled to the first terminal of said inductive means, said second terminal being coupled to said second means, and (c) a third diode having first and second electrodes, said diode being poled to pass current flowing from said first to second electrodes, said first electrode being coupled to said third switch means, said second electrode being coupled to said discharge resistor.

8. The switching circuit in accordance with claim 7 further including a balancing network comprising (a) first and second balancing capacitors coupled between the first and second sets of elements, said capacitors having a terminal therebetween coupled to the second switching circuit input terminal, and (b) first and second balancing resistors coupled between the first and second sets of elements, said resistors having a terminal therebetween, said terminal being coupled to the second switching circuit input terminal.

9. The switching circuit in accordance with claim 6 in which said first, second and third switch means comprise first, second and third silicon-controlled-rectifiers respectively, and further comprising a limiting resistor coupled between said first switching circuit input terminal and the first silicon-controlled-rectifier.

10. In a color television system of the type employing a single gun cathode ray tube having a color switching grid therein adjacent the screen, said grid including first and second sets of interlaced elements having a grid capacitance $C_G$ therebetween, a switching circuit for applying the color switching voltage between said sets of elements comprising:

(a) an inductance having first and second terminals, said second terminal being coupled to the first set of elements;

(b) first and second switching circuit input terminals, said second input terminal being coupled to said second set of elements, said first and second terminals having a reference voltage theretbetween;

(c) first switch means coupled between said first input terminal and the first terminal of said inductance;

(d) second switch means coupled between the first terminal of said inductance and the second set of elements;

(e) third switch means;

(f) a discharge resistor connected in series with said third switch means, said third switch means and said discharge resistor being coupled between the first and second sets of elements; and (g) actuating means coupled to said first, second and third switch means for sequentially actuating said means during successive horizontal retrace periods of said system.

References Cited

UNITED STATES PATENTS

| | | |
|---|---|---|
| 2,794,064 | 5/1957 | Rynn. |
| 2,866,127 | 12/1958 | Allwine. |
| 2,965,704 | 12/1960 | Schagen. |
| 2,971,048 | 2/1961 | Lawrence. |

RICHARD MURRAY, Primary Examiner